Jan. 27, 1970 G. E. CARROW 3,492,310
THERMOPLASTIC EXTRUSION
Filed Oct. 6, 1966
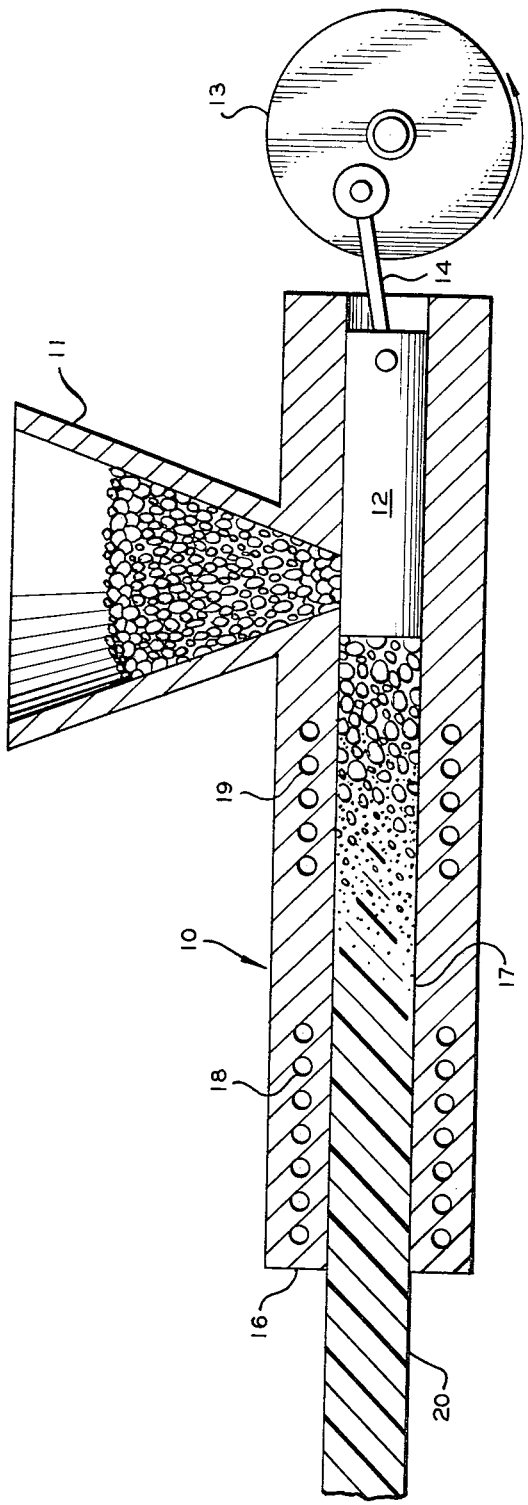
INVENTOR.
G.E. CARROW
BY
*Young & Quigg*
ATTORNEYS United States Patent Office 3,492,310
Patented Jan. 27, 1970

3,492,310
THERMOPLASTIC EXTRUSION
Guy E. Carrow, Bartlesville, Okla., assignor to Phillips Petroleum Company, a corporation of Delaware
Filed Oct. 6, 1966, Ser. No. 584,886
Int. Cl. C08g 45/44, 45/34
U.S. Cl. 260—32.6
8 Claims

ABSTRACT OF THE DISCLOSURE

Extrusion through a long land extrusion die by the application of pressure impulses is improved by incorporating glycerine and an amide into a polymer of ethylene.

---

This invention relates to the extrusion of thermoplastics. In one aspect this invention relates to thermoplastic extrusion compositions. In another aspect the invention relates to a process for the extrusion of thermoplastic compositions.

Polymers of olefins have properties which make them highly desirable for use in extruding articles of various profiles. One suitable olefin polymer is produced by the polymerization of an olefin or the copolymerization of a mixture comprising two or more olefins with a polymerization catalyst in a hydrocarbon solvent at a temperature such that substantially all of the polymer is soluble in the hydrocarbon. Such a polyolefin which is sometimes called "solution polymer" has a relatively low molecular weight and a relatively high melt index as measured by ASTM D1238-57T (Condition E). It is desirable to extrude such material dynamically through a long land die.

Dynamic extrusion, as referred to in this application, is the process of extrusion utilizing repeated pressure impulses and a long land die. A long land die is one having a long cross section of a desired configuration whereby the extrudate is initially formed, maintained in the desired shape, cooled and solidified without interruption in the die passage. The long land die has a passage length relatively large as compared with the thinnest portion or "thickness" of the profile and a temperature gradient is maintained in the die from a temperature above the melt temperature of the composition being extruded at an upstream point in the die to a temperature below the composition solidification temperature at the exit portion of the die.

Accordingly, it is an object of this invention to dynamically extrude thermoplastic materials.

Another object is to provide a thermoplastic extrusion composition.

Another object of this invention is to improve the extrusion of thermoplastic compositions by using a processability additive.

According to the invention, extrusion compositions for dynamic extrusion have glycerine and an amide of a higher fatty acid incorporated therein prior to extrusion.

Further in accordance with the invention thermoplastic compositions are extruded by incorporating glycerine and an amide of a higher fatty acid therein, and forcing the composition through a long land die by repeated pressure impulses.

Unexpectedly, it has been discovered that the incorporation of glycerine and the amide of a higher fatty acid with a solution polymer results in a thermoplastic composition which can be readily extruded dynamically through a long land die. This result is quite unexpected since neither glycerine alone nor the amide alone when incorporated with the solution polymer accomplishes this result.

The amides of a higher fatty acid used in the practice of this invention are the amides of saturated and/or unsaturated substantially water-insoluble aliphatic monocarboxylic acids. Excellent results are obtained with amides of such acids having from 10 to 22 carbon atoms in the molecule such as are present as free acids or glycerides in fatty oils. Typical fatty acid amides found useful are the amide of lauric acid, the amide of myristic acid, the amide of palmitic acid, the amide of stearic acid, the amide of oleic acid, and the amide of linoleic acid. Either an individually fatty acid amide can be used satisfactorily or a mixture of amides can be used to yield substantially equivalent results. In most instances the commercially available fatty acid amides are mixtures of various fatty acid amides and may contain up to about 5 percent by weight of free fatty acid.

The amount of glycerine used in this invention preferably is in the range of 0.5 to 1.5 percent by weight of the extrusion composition. An amide is added in an amount ranging from 0.1 to 1.0 percent by weight of the extrusion composition. The glycerine and amide can be incorporated by dry blending, that is, by mixing the additives with the granular or pelleted resin for example, as by tumbling or by precompounding in a Banbury mixer or a Farrow continuous mixer, etc.

The invention is applicable to the extrusion of thermoplastic compositions comprising one or more non-polar thermoplastic compounds. It is especially useful with compositions which are difficult to extrude dynamically. Excellent results are obtained in the dynamic extrusion of solution type polymers, including polyethylene solution polymers. Polyethylene solution polymers as used herein include polyethylene homopolymers, copolymers of ethylene and another polymerizable monomer, and mixtures of polyethylene homopolymers or copolymers with another polymer or copolymer of ethylene or another resin. However, the invention is suitable for use with any non-polar polymer having a melt index such that they are capable of being conventionally extruded. Visbroken particle form polymers are difficultly extrudable dynamically. "Particle form polymer" results from the polymerization of an olefin or copolymerization of a mixture of two or more olefins in the presence of a polymerization catalyst and a hydrocarbon diluent at temperatures such that substantially all of the polymer is insoluble in the hydrocarbon. Addition of glycerine and amide to a visbroken particle form polymer results in a thermoplastic composition which can readily be dynamically extruded.

In the drawing, an extrusion apparatus, suitable for practice of polymer extrusion according to the invention, is illustrated schematically. The apparatus comprises a long land die 10, a feed hopper 11, a reciprocating impulse piston 12, and a fly wheel 13, connected to piston 12 by a connecting rod 14.

Die 10, as illustrated, is constructed for the extrusion of a rectangular profile and comprises an outer bushing 16 and land surfaces 17. Bushing 16 has cooling means 18 and heating means 19 incorporated therein.

In operation, the extrusion composition having glycerine and the amide therein is placed in feed hopper 11. The fly wheel 13 is rotated by a suitable drive means such as an electric motor, not shown, and causes piston 12 to reciprocate in the extrusion apparatus. On one backstroke, piston 12 uncovers the open lower end of hopper 11, permitting a metered quantity of extrusion composition to flow into the extrusion channel. On the forward stroke, piston 12 forces the entire mass of extrusion composition forward, thus extruding a portion of rectangular profile 20 from die 10. The composition is granular as it leaves the position below hopper 11 and is gradually softened and fused together into a coherent mass as it comes under the influence of heating means 19 and extrusion pressures. The composition, while molten, is formed in the entrance portion of die 10 to the desired cross sectional shape, and is retained in this shape as it progresses through die 10 and comes under the influence of cooling means 18. The composition is cooled below its softening point and emerges from the outer end exit portion of die 10 in solidified form 20.

EXAMPLE I

A polyethylene extrusion composition was compounded comprising:

98.8 parts by weight of granular solution process ethylene-butene copolymer having a density of about 0.950 and a melt index (ASTM D1238–57T, Condition E) of about 0.3.

1.0 parts by weight of glycerine.
0.1 part by weight of dilaurylthiodipropionate.
0.1 part by weight 4,4'-thio-bis(6-tert-butyl-m-cresol).

The composition was blended using a Banbury mixer. Attempts to dynamically extrude the composition through a long land die in the shape of a channel were unsuccessful. The composition froze in the die and melt was forced back around the extrusion piston and into the hopper. The machine overloaded and it was necessary to remove the die in order to purge the extruder. Thus, it can be seen that the addition of glycerine alone to the polyethylene solution polymer did not result in a composition which is dynamically extrudable.

EXAMPLE II

The solution polymer as used in Example I was blended with 0.5 percent by weight of Armour Product Amide E in a Banbury mixer. The commercially available Armour Company product contained approximately 98 percent erucamide.

Attempts to dynamically extrude the composition through a long land die having a channel profile resulted in the same difficulties as reported in Example I.

EXAMPLE III

A polyethylene extrusion composition was compounded comprising:

98.3 parts by weight of granular solution process ethylene-butene copolymer as was used in Example I;
1.0 part by weight glycerine;
0.5 part by weight of the Amide B product of Armour Company containing 92 weight percent behenamide;
0.1 part by weight of dilaurylthiodipropionate;
and 0.1 part by weight of 4,4'-thio-bis(6-tert-butyl-m-cresol).

The composition was blended in a Banbury mixer. After mixing, the composition was dynamically extruded through a long land die having a channel profile. The melt had a temperature of approximately 400° F. and the composition was extruded at a rate of 6 to 25 inches per minute. The channel surfaces were smooth and well formed. There were no difficulties encountered in the operation of the dynamic extrusion apparatus.

Thus, it can be seen from the comparison of the results of Examples I, II, and III that while neither glycerine addition alone nor amide addition alone resulted in a dynamically extrudable solution polymer composition that the addition of both glycerine and amide to the solution polymer resulted in a composition which was capable of being dynamically extruded.

Reasonable variations and modifications are possible within the scope of this invention.

That which is claimed is:

1. An extrusion composition for dynamic extrusion consisting essentially of:
    a thermoplastic composition selected from the group consisting of ethylene homopolymers, copolymers of ethylene and another polymerizable monomer, and mixtures thereof;
    glycerine in an amount ranging from 0.5 to 1.5 percent by weight of said composition; and
    an amide selected from the group consisting of amides of the saturated and unsaturated substantially water-insoluble aliphatic monocarboxylic acids wherein said acids have from 10 to 22 carbon atoms in the molecule such as are present as free acids or their glycerides in fatty oils, and mixtures thereof, in an amount ranging from 0.1 to 1.0 percent by weight of said composition.

2. The composition of claim 1 wherein said thermoplastic composition comprises a solution process polymer.

3. The composition of claim 2 wherein said thermoplastic composition is a granular solution process ethylene-butene copolymer, glycerine is present in an amount of about 1 percent by weight and the amide is present in an amount of about .5 percent by weight.

4. The composition of claim 2 wherein said polymer is an ethylene homopolymer.

5. The composition of claim 2 wherein said polymer is an ethylene-butene copolymer.

6. A process for forming an elongated article, comprising the steps of:
    incorporating into a thermoplastic composition selected from the group consisting of ethylene homopolymers, copolymers of ethylene and another polymerizable monomer, and mixtures thereof an amount of glycerine in the range of 0.5 to 1.5 percent by weight of said composition; and
    an amide selected from the group consisting of amides of the saturated and unsaturated substantially water-insoluble aliphatic monocarboxylic acids and wherein said acids have from 10 to 22 carbon atoms in the molecule such as are present as free acids or their glycerides in fatty oils, and mixtures thereof, in an amount ranging from 0.1 to 1.0 percent by weight of said composition;
    forcing a plastic melt of said compositions containing said glycerine and said amide or mixture of amides through a long land extrusion zone by applying pressure impulses to said melt; and
    maintaining a temperature gradient along said zone to solidify said melt prior to removal from said zone.

7. The process of claim 6 wherein said thermoplastic composition comprises a solution process polymer.

8. The process of claim 7 wherein said thermoplastic composition is a granular solution process ethylene-butene copolymer, glycerine is present in an amount of about 1 percent by weight and the amide is present in an amount of about .5 percent by weight.

References Cited

UNITED STATES PATENTS

| | | | |
|---|---|---|---|
| 2,380,925 | 8/1945 | Cheyney | 260—32.6 |
| 2,448,358 | 8/1948 | Dangelmajer | 260—32.6 |
| 3,387,073 | 6/1968 | Larsen | 264—211 |

FOREIGN PATENTS

| | | |
|---|---|---|
| 915,589 | 1/1963 | Great Britain. |
| 972,244 | 10/1964 | Great Britain. |

DONALD E. CZAJA, Primary Examiner

D. J. BARRACK, Assistant Examiner

U.S. Cl. X.R.

260—33.4; 264—211